United States Patent
Chavan et al.

(10) Patent No.: US 9,114,988 B2
(45) Date of Patent: Aug. 25, 2015

(54) PROCESS FOR SEPARATION AND PURIFICATION OF SODIUM SULFIDE

(75) Inventors: Sandeep Vasant Chavan, Mumbai (IN); Kini Harshad Ravindra, Mumbai (IN)

(73) Assignee: Aditya Birla Science and Technology Company Private Limited, Mumbai (IN)

( * ) Notice: Subject to any disclaimer, the term of this patent is extended or adjusted under 35 U.S.C. 154(b) by 0 days.

(21) Appl. No.: 14/111,048

(22) PCT Filed: Apr. 12, 2012

(86) PCT No.: PCT/IN2012/000263
§ 371 (c)(1),
(2), (4) Date: Oct. 10, 2013

(87) PCT Pub. No.: WO2012/147097
PCT Pub. Date: Nov. 1, 2012

(65) Prior Publication Data
US 2014/0030185 A1 Jan. 30, 2014

(30) Foreign Application Priority Data
Apr. 15, 2011 (IN) .......................... 1235/MUM/2011

(51) Int. Cl.
| | | |
|---|---|---|
| C01B 17/22 | (2006.01) | |
| C01B 17/36 | (2006.01) | |
| B09B 3/00 | (2006.01) | |
| C10G 29/04 | (2006.01) | |
| C10G 53/08 | (2006.01) | |
| C10G 21/14 | (2006.01) | |

(52) U.S. Cl.
CPC .............. *C01B 17/36* (2013.01); *B09B 3/0016* (2013.01); *C01B 17/22* (2013.01); *C10G 21/14* (2013.01); *C10G 29/04* (2013.01); *C10G 53/08* (2013.01); *C10G 2300/1077* (2013.01); *C10G 2300/202* (2013.01)

(58) Field of Classification Search
CPC ........................................................ C01B 17/36
USPC ........................................... 423/561.1, 566.2
See application file for complete search history.

(56) References Cited

U.S. PATENT DOCUMENTS

| | | | |
|---|---|---|---|
| 3,165,378 A | | 1/1965 | Greenawalt |
| 3,320,157 A | * | 5/1967 | Arey, Jr. et al. ............... 208/249 |
| 3,565,792 A | | 2/1971 | Haskett |
| 3,657,064 A | | 4/1972 | Shick |
| 3,698,860 A | | 10/1972 | Shiba |
| 3,755,149 A | | 8/1973 | Kohn |
| 6,210,564 B1 | | 4/2001 | Brons et al. |
| 2005/0145545 A1 | | 7/2005 | Schucker |
| 2011/0147274 A1 | * | 6/2011 | Soto et al. ..................... 208/230 |
| 2012/0153387 A1 | | 6/2012 | Murthy et al. |

FOREIGN PATENT DOCUMENTS

| | | | | |
|---|---|---|---|---|
| CA | 2833208 | | 4/2012 | |
| CA | 2833208 A1 | | 11/2012 | |
| CN | 101391940 A | | 3/2009 | |
| CN | 101445458 A | | 6/2009 | |
| CN | 101481307 A | | 7/2009 | |
| CN | 201280018300.1 | | 4/2012 | |
| CN | 103635241 A | | 3/2014 | |
| EP | 12777572.4 | | 4/2012 | |
| EP | 2696954 A2 | | 2/2014 | |
| IN | 845/MUM/2011 | | 3/2014 | |
| JP | B-46-26402 | | 7/1971 | |
| JP | B-46-37761 | | 11/1971 | |
| JP | 50-12871 A | * | 2/1975 | ............... B03B 9/06 |
| JP | A-61-55283 | | 3/1986 | |
| JP | 4637761 B2 | | 2/2011 | |
| JP | 2014-504453 | | 4/2012 | |
| JP | 50-12871 B2 | | 8/2012 | |
| JP | 2014-504453 A | | 2/2014 | |
| KR | 10-2013-7028911 | | 4/2012 | |
| KR | 10-2013-7028911 | | 3/2014 | |
| MX | 2013012042 A | * | 5/2014 | ............. B01D 11/02 |
| WO | PCT/IN2012/000263 | | 4/2012 | |
| WO | WO-2012/147097 A2 | | 11/2012 | |

OTHER PUBLICATIONS

Written Opinion dated Dec. 20, 2012, for International Application No. PCT/IN2012/000263, filed Apr. 12, 2012 (4 pages).
International Preliminary Report on Patentability dated Dec. 12, 2012, for International Application No. PCT/IN2012/000263, filed Apr. 12, 2012 (5 pages).
Office Action issued on Feb. 12, 2015 by the Japanese Patent Office for application 2014-504453, filed on Apr. 12, 2012 and published as 2014-517798 on Jul. 24, 2014 (Partial Translation) (2 pages).
Office Action issued on Mar. 12, 2015 by the Canadian Intellectual Property Office for application 2833208, filed on Apr. 12, 2012 (3 pages).

* cited by examiner

*Primary Examiner* — Timothy Vanoy
(74) *Attorney, Agent, or Firm* — Ballard Spahr LLP

(57) ABSTRACT

The present disclosure provides a method for isolation and purification of sodium sulfide ($Na_2S$) formed during desulfurization of petroleum residue. The process involves treating a sludge containing $Na_2S$ obtained during desulfurization of petroleum residue with a mixture of at least one organic solvent and water.

6 Claims, No Drawings

PROCESS FOR SEPARATION AND PURIFICATION OF SODIUM SULFIDE

CROSS-REFERENCE TO RELATED APPLICATIONS

The present application is a U.S. National Phase Application of International Application No. PCT/IN2012/000263, filed Apr. 12, 2012, which claims priority to Indian Patent Application No. 1235/MUM/2011, filed Apr. 15, 2011, all of which applications are incorporated herein fully by this reference.

FIELD OF THE DISCLOSURE

The present disclosure relates to a process for separation and purification of sodium sulfide obtained during desulphurization of petroleum crude oil and heavy oils.

BACKGROUND

Sulfur-containing compounds are present to a greater or lesser extent in petroleum and in the refined products from petroleum. Organic sulfur compounds are undesirable in petroleum products for several reasons. They can poison catalysts used in petroleum refining. In addition, the greater the amount of organic sulfur compounds in hydrocarbon fuels, such as gasoline and heating oil, the greater the potential for pollution when these fuels are burned. Several methods have been developed over the years to deal with the problems posed by organic sulfur compounds in petroleum. These range from simple treatments aimed at rendering less offensive the malodorous sulfur compounds, to more complex processes to reduce or remove the sulfur compounds. The various methods used include absorption, extraction, oxidation hydro-desulfurization etc.

Desulfurization of heavy oils or petroleum crude oils using metallic sodium has been disclosed in several prior art processes.

U.S. Pat. No. 3,565,792 discloses an integrated process for the desulfurization of crude oil or similar virgin hydrocarbon fractions wherein a dispersion of metallic sodium is employed to react with the sulfur contaminants present within such crude oil to form a sodium sulfide precipitate eliminated from the treated crude through centrifugation. The integrated system is provided by reacting the sodium sulfide precipitate with hydrochloric acid to produce sodium chloride which after reclamation can be employed through electrolysis to provide the necessary sodium for desulfurization of the crude oil.

U.S. Pat. No. 3,755,149 discloses a process for desulfurizing vacuum bottoms of a short residue which consists of contacting said residue with metallic sodium at a temperature of from about 250° C. to about 400° C. and at a hydrogen pressure of from about 1 to about 100 atmospheres, extracting the sludge-containing product thus produced with an aliphatic hydrocarbon, separating the sludge from the hydrocarbon extract and removing said hydrocarbon to yield a desulfurized resid.

U.S. Pat. No. 6,210,564 discloses a process for desulfurization of petroleum feeds utilizing sodium metal. Sulfur-containing petroleum feeds are desulfurized by contacting the feeds with staged addition of sodium metal at temperatures of at least about 250° C. in the presence of excess hydrogen to sodium metal. The formation of $Na_2S$ is substantially suppressed and the formation of NaSH is promoted in the desulfurization process.

US2005145545 discloses desulfurization of petroleum streams using metallic sodium. The method of removing sulfur from a hydrocarbon feed involves the steps of dissolving metallic sodium in a solvent and combining the sodium/solvent solution with a liquid hydrocarbon feed containing an organosulfur species. The pressure of combination is above the vapor pressure of the solvent. The combined hydrocarbon feed and solvent solution are placed in a low pressure environment to vaporize the solvent. The resulting stream is combined with hydrogen gas and this stream is heated and pressurized to form a liquid hydrocarbon product containing sodium sulfide. This product is then cooled and the sodium sulfide is extracted.

A co-pending Indian Patent application No. 845/MUM/2011 discloses an improved process of desulfurization of petroleum residue by means of addition of a suitable organic solvent to the petroleum feed oil prior to the desulfurization reaction. The process results in the formation of sodium sulfide ($Na_2S$) as a major by-product.

In general, the $Na_2S$ formed is filtered and separated from the desulfurized feed oil and is then either dissolved in water or subjected to Na recovery by electrolysis process. This by-product obtained is essentially in the form of a sticky sludge and may contain impurities such as un-reacted Na, residual feed oil and other organic sodium salts.

One of the major challenges is the separation and filtration of the by-product from that of the desulfurized oil. A substantial quantity of the feed oil remains associated with this $Na_2S$ by-product. The addition of water directly for the by-product recovery, doesn't result in complete dissolution of $Na_2S$ due to a water impenetrable coating of the residual feed oil on the by-product. This feed oil remaining associated with the $Na_2S$, results in the formation of an emulsion on addition of water, probably due to the high viscosity and sticky nature of petroleum feed oil and similar specific gravities of water and oil. This leads to the formation of a non-separable mass which results in loss of valuable feed oil remaining associated to the by-product, as well as contamination of $Na_2S$ solution by the feed oil. Further, the recovery of oil from the by-product sludge can be carried by means of an organic solvent capable of dissolving the oil. However, a multistep process is required with addition of the fresh organic solvent at each step. This results in use of large quantities of organic solvent and thus adding to the cost of solvent recovery by distillation in addition to the solvent loss associated with the separation and distillation processes.

Still, further, the solvent is unable to completely recover the oil even by means increasing the extraction steps. This is because as the solvent dissolves the oil, fresh $Na_2S$ surfaces are exposed which are not soluble in the organic solvents. Thus, the oil that has remained entrapped by the solid $Na_2S$ surface doesn't get exposed to the organic solvent and hence the dissolution efficiency drops down drastically.

Accordingly, it is desirable to develop a simple process for separation and purification of sodium sulfide obtained as a major by-product from the process of desulfurization of petroleum oils.

Further, it is known that the use of the $Na_2S$ by-product in general is towards regeneration of Na by means of suitable electrolytic processes. The present disclosure is also aimed at value addition to this $Na_2S$ by-product by means of oxidation to $Na_2SO_3$ which is a higher value product.

Some of the representative patent documents which disclose methods for converting sodium sulfide into sodium sulfite are described herein below.

U.S. Pat. No. 3,165,378 discloses a method of converting sodium sulfide produced by preliminary treatment of spent liquor which is recovered from the chemical solution used in production of paper pulp from wood and the like and which contains sulfur compounds. The process comprises passing an aqueous solution containing sodium sulfide through a reaction zone in an atmosphere of saturated steam and air under substantially constant pressure within the range of 60 to 125 pounds per square inch.

U.S. Pat. No. 3,657,064 discloses direct oxidative conversion of sodium sulfide to sodium sulfite by absorbing the heat of reaction in a fluidized bed system using adiabatic cooling.

U.S. Pat. No. 3,698,860 discloses a process for converting sodium sulfide in the smelt resulted from the burning of black liquor from digesters of semichemical pulp and sulfite pulp to sodium sulfite by oxidation and recovering the latter as pulp digesting chemical, which comprises mixing the smelt particles with water, adding thereto a minor amount of sodium hydroxide forming the mixture into particles and introducing the particles into a converter packed with dry powder of sodium sulfite, sodium carbonate, etc., containing no sodium sulfide, the process being performed throughout as a wet process.

The processes disclosed in the prior art patent documents are complex and time consuming. Accordingly, it is desirable to develop a simple method for converting sodium sulfide into sodium sulfite which avoids utilization of catalyst.

OBJECTS OF THE DISCLOSURE

Some of the objects of the present disclosure are described herein below:

It is an object of the present disclosure to provide a process for isolation and purification of sodium sulfide ($Na_2S$) formed during desulfurization of petroleum residue.

It is another object of the present disclosure to provide a process for obtaining sodium sulfite ($Na_2SO_3$) from $Na_2S$ formed during desulfurization of petroleum residue.

SUMMARY OF THE DISCLOSURE

In accordance with the present disclosure there is provided a method for isolation and purification of sodium sulfide ($Na_2S$) formed during desulfurization of petroleum residue; said method comprising treating a sludge containing $Na_2S$ by-product obtained during desulfurization of petroleum residue with a mixture of at least one organic solvent capable of dissolving the petroleum residue and water; allowing the treated sludge to separate into an organic phase containing petroleum oil and an aqueous phase containing $Na_2S$; and distilling the aqueous phase to obtain isolated $Na_2S$ followed by purification.

Typically, the organic solvent is selected from the group consisting of alkanes, aromatic hydrocarbons, alkenes, cyclic alkenes, alkynes and mixtures thereof.

In accordance with one of the embodiments of the present disclosure the organic solvent is at least one hydrocarbon solvent selected from the group consisting of xylene, n-hexane, cyclo-hexane, heptane, hexane, heptene, octane and toluene.

Preferably, the organic solvent is xylene.

Typically, the proportion of the organic solvent to water is 0.5:1 to 2:1.

In accordance with another embodiment of the present disclosure there is provided a method for recovering $Na_2S$ and oil from a sludge resulting from desulfurization of petroleum residue; said method comprising the following steps:

preparing a mixture of at least one organic solvent and water;

adding the mixture to the sludge at a temperature of about 25-100° C. for a period of about 20 minutes to 2 hours under stirring and optionally cooling to obtain a solution;

transferring the solution to a separating funnel and setting it aside to obtain a mixture containing an aqueous phase containing $Na_2S$ and an organic phase containing petroleum oil; and distilling each of the two phases separately to recover the organic solvent and the oil from the organic phase and water and $Na_2S$ from the aqueous phase respectively.

In accordance with another embodiment of the present disclosure there is provided a method for separation and purification of sodium sulfide ($Na_2S$) formed during desulfurization of petroleum residue; said method comprising subjecting a sludge containing $Na_2S$ obtained during desulfurization of petroleum residue to washing with at least one organic solvent followed by treatment with water.

In accordance with another aspect of the present disclosure there is provided a process for the preparation of sodium sulfite ($Na_2SO_3$) from sodium sulfide ($Na_2S$) which is obtained by the process of the present disclosure; said process comprising oxidation of sodium sulfide ($Na_2S$).

Typically, the oxidation of sodium sulfide ($Na_2S$) comprises dissolving sodium sulfide in distilled water to obtain a solution; refluxing the solution at a temperature of about 50 to 80° C.; purging compressed air through the solution for a period of about 20 minutes to 120 minutes; and heating the solution at a temperature of about 140 to 180° C. to obtain solid sodium sulfite powder.

DETAILED DESCRIPTION OF THE DISCLOSURE

In accordance with the present disclosure there is provided a method for isolation and purification of sodium sulfide ($Na_2S$) formed during desulfurization of petroleum residue. The process is described herein below in detail. Initially, a sludge containing $Na_2S$ which is obtained during desulfurization of petroleum residue is treated with a mixture of at least one organic solvent capable of dissolving the petroleum residue and water. In the next step, the treated sludge is allowed to separate into an organic phase containing petroleum oil and an aqueous phase containing $Na_2S$. Finally, the aqueous phase is subjected to distillation to obtain isolated $Na_2S$ followed by purification.

In accordance with the present disclosure the organic solvent used for treating the sludge includes but is not limited to alkanes, aromatic hydrocarbons, alkenes, cyclic alkenes, alkynes and mixtures thereof.

In accordance with one of the embodiments of the present disclosure the organic solvent is at least one hydrocarbon solvent selected from the group consisting of xylene, n-hexane, cyclo-hexane, heptane, hexane, heptene, octane and toluene.

In accordance with the preferred embodiment of the present disclosure the organic solvent used for treating the sludge is xylene.

Typically, the proportion of the organic solvent to water is 0.5:1 to 2:1.

In accordance with another embodiment of the present disclosure there is provided a method for recovering $Na_2S$ and oil from a sludge resulting from desulfurization of petroleum residue. The method is described herein below:

Initially, a mixture of at least one organic solvent and water is prepared. The mixture of organic solvent and water is then added to the sludge at a temperature between 25-100 deg C.

for a period of about 20 minutes to 2 hours under stirring which is then optionally cooled to obtain a solution. The obtained solution is transferred to a separating funnel. It is then allowed to settle to obtain a mixture containing an aqueous phase containing $Na_2S$ and an organic phase containing oil.

In the nest step, the organic phase is subjected to distillation to isolate organic solvent and oil. Separately, the aqueous phase is also subjected to distillation to isolate water and $Na_2S$.

Typically, the method further comprises a method step of recycling of the organic solvent.

The inventors of the present disclosure found that the addition of xylene-water mixture results in a better separation of the treated feed oil and $Na_2S$ as well as better dissolution of $Na_2S$ which results in formation of a $Na_2S$ solution.

The presence of xylene results in continuous removal and dissolution of residual feed oil bound to the $Na_2S$, thereby exposing fresh $Na_2S$ surfaces which then readily gets dissolved in water. The dissolved $Na_2S$ in turn leads to the release of feed oil which further gets captured by xylene. Thus, these two processes go hand in hand and result in better separation of residual feed oil and $Na_2S$.

Another advantage of the present disclosure is that the organic solvent such as xylene used in the process is able to separate the aqueous phase (containing $Na_2S$) and the organic phase (containing feed oil), thereby eliminating the need of any further filtration unit.

In accordance with another embodiment of the present disclosure, the addition of a mixture containing at least one organic solvent and water is carried out immediately after the desulfurization process and $Na_2S$ product filtration.

In accordance with the present disclosure there is also provided an alternative method for separation and purification of sodium sulfide ($Na_2S$) formed during desulfurization of petroleum residue. The method involves subjecting a sludge containing $Na_2S$ obtained during desulfurization of petroleum residue to washing with at least one organic solvent followed by treatment with water.

The $Na_2S$ solution obtained may not be in pure form and may contain NaOH, $Na_xS_y$, along with other inorganic and organic impurities from the feed oil. Therefore, the solution is purified by filtering it through activated carbon to obtain a clear solution.

In accordance with further aspect of the present disclosure there is provided a process for the preparation of sodium sulfite from sodium sulfide ($Na_2S$) obtained by the process as described herein above. The process of preparing sodium sulfite involves oxidation of sodium sulfide ($Na_2S$). The oxidation process is described herein below.

In the first step, sodium sulfide is dissolved in distilled water to obtain a solution which is refluxed at a temperature of about 50 to 80° C. Compressed air is then purged through the solution for a period of about 20-120 minutes. The solution is heated at a temperature of about 140° C.-180° C. to obtain solid sodium sulfite powder.

The advantage of the oxidation process of the present disclosure is that it is carried out in the absence of catalyst.

The processes are described herein below in detail with the help of following non-limiting examples. The following examples are merely illustrative of the disclosure and should not be construed as limiting.

EXAMPLES

The desulfurization examples described below were carried on Carbon Black Feed Oil (CBFO) which is a representative of the petroleum oil fraction (residue), especially known as heavy oil or residual oil. The CBFO desulfurization experiments were carried using sodium metal. The detailed description of the desulfurization process is given in co-pending Indian Patent application No. 845/MUM/2011. Thus, the desulfurization of the CBFO was primarily carried using sodium, however, involving process variants in terms of hydrogen and the organic solvent xylene as the auxillary components. Thus, in order to study the effect of hydrogen and xylene on the desulfurization process in terms of yield and by-product formation, the following schemes were investigated:

Example 1: Desulfurization with sodium in the presence of xylene and in absence of $H_2$ Example 2: Desulfurization with sodium in the presence of xylene and in presence of $H_2$ Example 3: desulfurization with sodium in the absence of xylene and in absence of $H_2$ Example 4: Desulfurization with sodium in the absence of xylene and in presence of $H_2$ Example 1

About 210 g of CBFO and 90 ml of xylene were taken in a high pressure reactor. This corresponds to a ratio of CBFO:xylene of 70:30 (weight:volume). No hydrogen was added to the reactor. Stoichiometric amount of sodium metal was then added to the reactor. The reaction was then carried at a temperature of about 290° C. with a residence time of 1 h. After the reaction the contents were cooled and decanted. This resulted in formation of two distinct phases, that of the desulfurized CBFO as a liquid phase and a sludge of $Na_2S$+CBFO as the semisolid phase. The decanted CBFO was weighed and the yields of this CBFO and that of the sludge are given in Table-1.

Example 2

About 210 g of CBFO and 90 ml of xylene were taken in a high pressure reactor and about 300 psig of hydrogen was added to the reactor.

Example 3

About 210 g of CBFO was taken and no xylene or hydrogen was added.

Example 4

About 210 g of CBFO was taken and no xylene was added, however, about 300 psig of hydrogen was added to the reactor.

In all the examples 2-4, stoichiometric amount of sodium metal was added and the reaction conditions and processes were similar to that given in example-1. All these examples resulted in formation of CBFO and sludge ($Na_2S$+CBFO) in varying proportions. The yield of the decanted CBFO and the sludge are provided in Table-1. It was observed that the examples (1 & 2) which use xylene, the CBFO yield was higher while the sludge yield was lower as compared to examples (3 & 4) with no xylene.

TABLE 1

CBFO and sludge yields for different process schemes

| Example | Composition | Desulfurized CBFO yield (%) | Sludge (%) |
|---|---|---|---|
| 1. | No Hydrogen + Xylene (30%) | 72 | 28 |
| 2. | Hydrogen + Xylene (30%) | 78 | 22 |
| 3. | No Hydrogen + No Xylene | 54 | 46 |
| 4. | Hydrogen + No Xylene | 60 | 40 |

Another desulfurization experiment was carried using lower amount of xylene (5%) in order to reduce the xylene content for better process economics as well as improving the desulfurization and processing efficiency. The experimental details are given in example 5 below.

Example 5

Desulfurization in the Presence of Low Amount of Xylene (5%) and in the Presence of $H_2$ In this case about 285 g of CBFO and 15 ml of xylene were taken in a high pressure reactor and about 300 psig of hydrogen was added to the reactor. To this, stoichiometric amount of sodium metal was added. The reaction temperature was kept to about 290° C. for a residence time of 1 h. Thus, after the reaction the CBFO was cooled and decanted. This scheme also resulted in substantial amount of sludge ($Na_2S$+CBFO) phase. The decanted CBFO was weighed. The yield of the CBFO and the sludge is provided in table no. 2

TABLE NO. 2

| Example | Composition | Desulfurized CBFO yield (%) | Sludge (%) |
|---|---|---|---|
| 5 | $H_2$ + Xylene (5%) | 76 | 24 |

In all the above examples (1-5), separation and purification of $Na_2S$ present in the sludge was carried out, by means of simultaneous addition of an organic solvent and water to this sludge. The organic solvent used in accordance with the preferred embodiment of the present disclosure being xylene. Thus a (1:1) mixture of Xylene and water was prepared by taking 250 ml of Xylene and 250 ml of water. It may be noted that the term mixture here refers to xylene and water were taken together in a beaker, however, they were not homogenous mixture and were understandably immiscible. Thus a 1:1 xylene:water mixture was added to the 28% of sludge formed in the example 1 and was then heated at 100° C. for 1 hour under vigorous stirring. The contents were then allowed to cool and entire solution was collected in a beaker. Thus, it was observed that the sludge containing viscous CBFO and solid $Na_2S$ was converted into what appeared to be a uniform solution without any solid presence. Thus, there was no further requirement of filtration for the separation of the solids from the oil. The entire solution was then transferred into a separating funnel and allowed to stabilize. This eventually resulted into a clear phase separation of water layer with $Na_2S$ dissolved in it and a xylene layer with the residual CBFS dissolved in it. Further for examples (2-4), the various amount of sludge were treated with the same amount of xylene:water mixture, and were further heated at 100° C. for 1 hr, cooled and allowed to separate.

After the separation into two layers, the layers were collected individually for each of examples (1-4). The xylene+ CBFO layer was then subjected to a rotavapor for distilling out the xylene from the mixture. The pure xylene was then recovered and was collected back, leaving behind the residual CBFO. The xylene collected could then be recycled for the desulfurization process. The CBFO could be added back to the desulfurized CBFO, thus increasing the total yield or minimizing the loss. Similarly, for the water layer, the water was distilled in a rotavapor and collected back, leaving behind the yellow colored sodium sulfide powder.

In example 5, separation and purification of $Na_2S$ present in the sludge was carried out in the similar manner in that of example (1-4). The only change in the process was the amount of xylene-water mixture added to the system. In this case about 100 ml of xylene and 100 ml water was added to the 24% of sludge formed during the process. This mixture was then heated at 100° C. for 1 hour and then the system was allowed to cool. The entire solution which appears to be uniform and miscible was collected in a beaker. This was then allowed to stabilize in a separating funnel, which leads to a clear phase separation of water layer with $Na_2S$ dissolved in it and a xylene layer with the residual CBFS dissolved in it. The xylene and water layer were then distilled out as in previous examples. The table No. 3 summarizes the desulfurization efficiencies for various example schemes as well as the amount of $Na_2S$ solid recovered.

TABLE 3

Desulfurization efficiencies for different schemes and $Na_2S$ amount.

| Example | Composition | Desulfurization (%) | Sludge | $Na_2S$ (g) |
|---|---|---|---|---|
| 1 | No Hydrogen + Xylene | 60 | 28 | 16.7 |
| 2 | Hydrogen + Xylene | 68 | 22 | 12 |
| 3 | No Hydrogen + No Xylene | 80 | 46 | 15 |
| 4 | Hydrogen + No Xylene | 70 | 40 | — |
| 5 | Hydrogen + Xylene (5%) | 80 | 24 | — |

The second part of the disclosure with respect to the purification and conversion of the $Na_2S$ to $Na_2SO_3$ is described herein below with the help of following examples.

Example 6

210 g of CBFO was mixed with 90 ml of xylene. This resulted in a mixture as CBFO:Xylene=70:30 (weight:volume basis). The mixture was mixed thoroughly and then transferred to a high pressure reactor. Stoichoimetric amount of sodium metal was weighed separately. The sodium metal was then cut into small pieces and added to the CBFO/xylene mixture in the reactor. The reactor was then pressurized with about 300 psi of hydrogen. The reactor was subsequently heated to a temperature of 290° C. for a period of 1 h. After the reaction, the entire solution was allowed to cool down to room temperature and then the CBFO was decanted. The CBFO and the sludge amounts were separated and weighed. The percentage desulfurization along with the percentage yield of the CBFO and the sludge are given below.

TABLE 4

| Example | Composition | Desulfurization (%) | Desulfurized CBFO yield (%) | Sludge (%) |
|---|---|---|---|---|
| 6 | H2 + xylene (30%) | 70 | 78 | 22 |

In this example (6), separation and purification of $Na_2S$ present in the sludge was carried out differently, wherein the sludge was subjected to a xylene washing with 100 ml of xylene at 60° C. This xylene washing process was repeated thrice so as to purify the $Na_2S$ as much as possible by means of dissolving the CBFO attached to the sludge in the xylene. After the xylene washing treatments, the solid mass was treated with 200 ml water at 90° C., which resulted in the formation of a turbid black color solution primarily consisting of dissolved sodium sulfide and some solid carbon impurities. This solution obtained was then filtered using activated carbon, to remove the carbon impurities and obtain a purified clear yellow colored sodium sulfide solution. Further, water from this solution was removed by thermal dehydration to obtain a yellow colored sodium sulfide powder.

This solid sodium sulfide product obtained from the overall desulfurization and purification process was further subjected to an oxidation process using compressed air to form sodium sulfite.

Thus, about 1.2 g sodium sulfide powder as obtained in example 6 was taken in a beaker and dissolved in 25 ml of distilled water.

This solution was then transferred in a 3-neck round bottom flask and was heated at temperature range of 60-70° C., with a reflux. Compressed air was then purged into this solution at this temperature for a period of 30 min. After 30 minutes, the solution was then transferred into the beaker and then heated further to a temperature of 160° C. This resulted in evaporation of the excess water and regeneration of solid sodium sulfite powder.

Further, experiments were carried in order to optimize the process of the sodium sulfite formation. These optimization studies are discussed in example 7, 8 and 9. The process conditions/parameters are provided in Table No. 5.

TABLE 5

Process optimization at different residence time

| Example | Sodium sulfide amount (g) | $H_2O$ amount (ml) | Time (min) | Temperature (° C.) |
|---|---|---|---|---|
| 7 | 1.0 | 25 | 30 | 60-70 |
| 8 | 1.0 | 25 | 60 | 60-70 |
| 9 | 1.0 | 25 | 90 | 60-70 |

The above Table describes the effect of time on the formation of sodium sulfite ($Na_2SO_3$) product. Thus, in each case, the amount of sodium sulfide ($Na_2S$) and water required for dissolution was kept constant. The reactions were again carried at a temperature of 60-70° C. with different residence intervals of 30 min, 60 min, and 90 min, respectively. The system was then cooled and the regenerated solid material was then subjected to XRD analysis for its phase determination.

It was observed that the purity of the sodium sulfite formed for each of the cases was similar irrespective of the reaction time intervals.

Example 10

In this example, a step of thermal dehydration as described in Example 6 was avoided. i.e. the solution of sodium sulfide was not converted into solid sodium sulfide. Instead of that the water layer obtained from example 1 was directly filtered using activated carbon which results in formation of a clear yellow colored solution. About 25 ml of this solution was then taken in a 3-neck round bottom flask and was heated at temperature of 60-70 C with a reflux. Compressed air was then purged into this solution at this temperature for a period of 30 min. After 30 min. the solution was then transferred into the beaker and heated on to 160° C. to regenerate solid sodium sulfide.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for isolation and purification of sodium sulfide ($Na_2S$) formed during desulfurization of petroleum residue; said method comprising treating a sludge containing $Na_2S$ obtained during desulfurization of petroleum residue with a mixture of at least one organic solvent capable of dissolving the petroleum residue and water; allowing the treated sludge to separate into an organic phase containing petroleum oil and an aqueous phase containing $Na_2S$; and distilling the aqueous phase to obtain isolated $Na_2S$ followed by purification.

2. A method for recovering $Na_2S$ and oil from a sludge resulting from desulfurization of petroleum residue; said method comprising the following steps:
   preparing a mixture of at least one organic solvent and water;
   adding the mixture to the sludge at a temperature of about 25 to 100° C. for a period of about 20 min to 2 hours under stirring and optionally cooling to obtain a solution;
   transferring the solution to a separating funnel and setting it aside to obtain a mixture containing an aqueous phase containing $Na_2S$ and an organic phase containing petroleum oil; and distilling each of the two phases separately to recover the organic solvent and the oil from the organic phase and water and $Na_2S$ from the aqueous phase respectively.

3. The method as claimed in claim 1, wherein the organic solvent is selected from the group consisting of alkanes, aromatic hydrocarbons, alkenes, cyclic alkenes, alkynes and mixtures thereof.

4. The method as claimed in claim 1, wherein the organic solvent is at least one hydrocarbon solvent selected from the group consisting of xylene, n-hexane, cyclohexane, heptane, hexane, heptene, octane and toluene.

5. The method as claimed in claim 1, wherein the proportion of the organic solvent to water is 0.5:1 to 2:1.

6. The process as claimed in claim 1, wherein the sodium sulfide ($Na_2S$) is further oxidized to $Na_2SO_3$; said oxidation comprising dissolving $Na_2S$ in distilled water to obtain a solution; refluxing the solution at a temperature of about 50 to 80° C.; purging compressed air through the solution for a period of about 20 minutes to 120 minutes; and heating the solution at a temperature of about 140° C. to 180° C. to obtain solid sodium sulfite ($Na_2SO_3$) powder.

\* \* \* \* \*